455-619 AU 233 EX
FIP8106 XR 3,519,936

FACSIMILE TRANSMISSION BY SELECTIVE SIGNAL PULSE SUPPRESSION

Filed Jan. 5, 1967

United States Patent Office 3,519,938
Patented July 7, 1970

3,519,938

FACSIMILE TRANSMISSION BY SELECTIVE SIGNAL PULSE SUPPRESSION

George Mitchell Smith, Eastleigh, England, assignor to The General Electric Company Limited, London, England, a British company Filed Jan. 5, 1967, Ser. No. 607,414
Claims priority, application Great Britain, Jan. 5, 1966, 514/66
Int. Cl. H03k *7/06, 9/06*
U.S. Cl. 325—38 4 Claims

ABSTRACT OF THE DISCLOSURE

A binary data facsimile transmission system in which the facsimile data is encoded as a periodic clock pulse signal in which one of the two kinds of data is represented by a clock pulse and the other kind is represented alternately by a clock pulse and the absence of a clock pulse. Thus, the encoded signal is closely derived from the data bit-rate clock pulse signal by suppressing or not suppressing alternate pulses so that timing information is carried by the signal irrespective of which kind of data is being transmitted.

Figure 1:
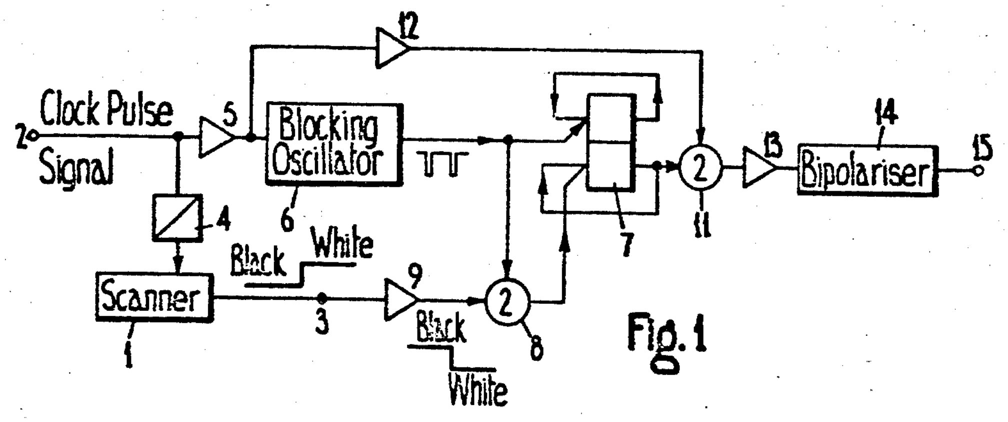

This invention relates to a binary data transmission system.

The invention may be applied to the transmission of a facsimile of printed or pictorial matter where the information may be represented by changes of optical brightness level on scanning the matter with optical sensing means. In general, useful information can be obtained by deriving an electrical signal which has two levels corresponding to two brightness level ranges and deriving a pulse signal in which there is selectively either a pulse or no pulse in dependence upon the level of the signal at that time. A disadvantage of simple arrangements of this kind is that one or other brightness level may persist for an extended period which may result in a lack of basic timing information.

An object of the present invention is to provide a data transmission system capable of transmitting such two-level information without the above disadvantage and with reasonable economy of transmission time.

According to one aspect of the present invention, in a binary data transmission system the data is encoded as a periodic pulse signal in which one of the two kinds of data is represented by a pulse and the other kind is represented alternately by a pulse and the absence of a pulse so that timing information is carried by the signal irrespective of which kind of data is being transmitted.

The successive pulses present in the transmitted signal are preferably of opposite polarity so that the average signal level is substantially zero.

The data to be transmitted may be two ranges of optical brightness.

According to another aspect of the invention, coding apparatus for a data transmission system, includes means for providing an electric signal having one of two levels according to which of two kinds of information is being encoded, means for sampling said signal periodically and means for producing an output signal comprising a periodic pulse signal having one or other of two pulse repetition frequencies according to the value of the signal samples.

The coding apparatus may comprise bistable circuit means having two stable states and circuit means to supply periodic triggering pulses to the bistable circuit, circuit means to trigger it repeatedly to, or maintain it in, one stable state during a first of said two levels of said electric signal and to trigger it repeatedly between said stable states during the second of said two levels, and circuit means to provide an output signal comprising, either, a periodic pulse sequence or no pulses, according to whether the bistable circuit means is in said one or the other of its stable states respectively.

According to a further aspect of the invention, decoding apparatus, for a data transmission system in which two kinds of information are transmitted by a pulse modulation signal in which one of said two kinds of information is represented by a pulse present and the other kind is represented alternately by a pulse present and a pulse absent, includes bistable circuit means, having two stable states, arranged to be triggered to or maintained in, one of said states by any pulse present in the received signal, and to the other of said states by the absence of any pulse in the received signal, means to supply a signal comprising disabling pulses effective for periods corresponding to the duration of said other state but delayed in time with respect thereto, gate means arranged to supply triggering pulses at the basic repetition frequency of the system to a second bistable circuit having two stable states, when enabled by the co-incidence of pulses present in the received signal and the absence of said disabling pulses, said second bistable circuit being triggered to, or maintained in, one of its stable states by said triggering pulses from said gate means and triggered to or maintained in, the other of its stable states by the absence of any pulse in the received signal, the arrangement being such that the two kinds of information transmitted are represented by the existence of the two stable states respectively of the second bistable circuit.

According to a further aspect of the invention, a facsimile transmission system includes, at a transmitting terminal, means for deriving, from a two-level signal in which the two levels correspond respectively to black and white in the information to be transmitted, a binary pulse coded signal in which one of said two levels, for example the level corresponding to black, is represented by the pulse representation of one binary digit, and the other of said two levels is represented alternately by the pulse representations of the two binary digits.

Figure 2:
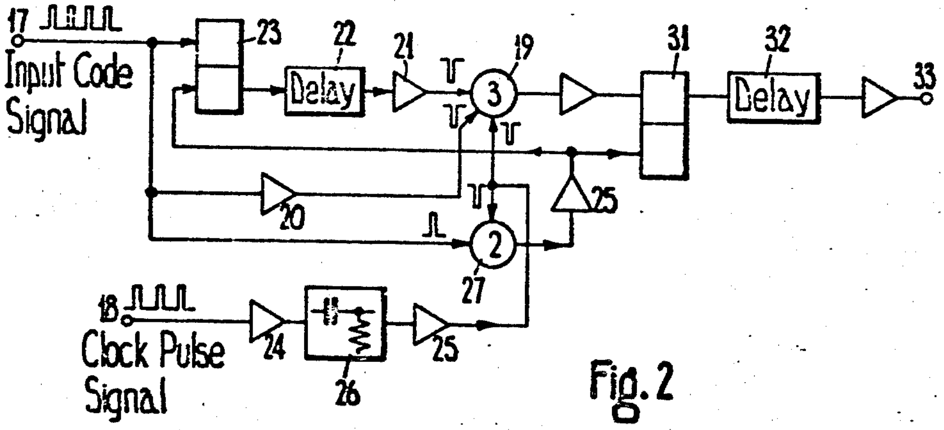

A data transmission system in accordance with the invention will now be described, by way of example, as applied to the transmission of facsimile information and with reference to the accompanying drawings, of which;

FIGS. 1 and 2 are block schematic diagrams of a signal encoder and a sinal decoder.

The image to be transmitted is scanned by an optical scanner 1 which produces an electrical output signal having two levels according to which of two brightness ranges the scanner spot falls within. The scanning definition is such that the line thickness of an average printed character provides a response in the scanner output signal. The brightness ranges correspond approximately to black and white and the scanner output signal level is zero for black and three volts positive for white.

A coder to which the scanner 1 output is supplied has one input terminal 2 to which a high frequency "clock" pulse signal is supplied, and a second input terminal 3 to which the scanner output signal is supplied. In order that the final reproduction at the receiver may be synchronised with the scanner at the transmitter the clock pulse signal is also used, after counting down to a lower frequency by means of a frequency divider 4, to time the operation of the scanner. The clock pulse frequency must be sufficiently high in relation to the scanning velocity that an average line thickness will be scanned in not less than several clock pulse periods. The whole system is then synchronised to the clock pulse signal.

The clock pulse input terminal 2 is connected to an amplifier 5 which supplies the amplified pulses to a blocking oscillator 6. The blocking oscillator 6 output consists of a sequence of negative-going pulses of the clock pulse frequency. This signal is supplied to one trigger input or a bistable circuit 7 and also to one input of a two input coincidence gate 8. The output signal of this gate is supplied to the other trigger input of the bistable circuit 7 each stage of which provides a self-enabling signal. The other input of the coincidence gate 8 is supplied by way of an amplifier stage 9 from the terminal 3 of the coder. This input of the gate 8 is therefore supplied with a negative-going (enabling) signal when a white area is scanned.

An output signal is derived from that stage (the "output" stage) of the bistable circuit to which the output signal from the gate 8 is supplied. The bistable output signal is supplied to a two input coincidence gate 11 which provides a negative output signal when the two input signals thereto are negative. The other input of this gate is supplied with negative going clock pulses by way of amplifier 12 which, in effect, sample the bistable (7) state periodic. This gate 11 supplies an amplifier 13 from which any pulses obtained are positive-going. This signal is then supplied to a bipolarising stage 14 by means of which alternate pulses produce a reversal of the signal polarity to remove the D.C. content of the signal which is then suitable for transmission along a line by way of terminal 15.

The operation of the circuit is as follows. On scanning a black area the input signal to the terminal 3 is (relatively) negative so that the gate 8 is disabled and no narrowed clock pulses are supplied to trigger the output stage of the bistable circuit 7. If this stage is in its "conducting" state, therefore, it will remain so throughout the "black" condition as each trigger input of the bistable is only effective to switch "off" its respective stage. While the output stage is in its "on" or conducting state, however, it is enabled, by means of its fed back output, for triggering to the "off" state if a negative-going trigger pulse is applied to the trigger input. This also applies to the other stage of the bistable circuit 7 when it is in its "on" (conducting) state.

In the "black" condition the narrowed clock pulses from the blocking oscillator 6 direct are effective to switch "on" (if not already "on") the output stage of the bistable circuit 7 which then remains in that state after the first such narrowed clock pulse. There is thus a stable negative output signal from the bistable circuit 7 which is sampled by the negative going clock pulses in the coincidence gate 11. After amplification, by the amplifier 13, the signal comprises a sequence of positive-going pulses, at the clock pulse frequency.

On scanning a white area, the scanner 1 output signal is positive and after inversion in the amplifier 9 provides a negative signal to the coincidence gate 2 which therefore passes the narrowed clock pulses to the trigger input of the bistable circuit 7 output stage. Simultaneous triggering pulses are therefore then being supplied to both stages of the bistable circuit 7. However, as mentioned above, only the conducting stage provides an enabling signal to its own trigger input so that during the "white" condition the triggering signals to the two trigger inputs will be effective alternately, the bistable circuit 7 being switched from one stable state to the other at each clock pulse.

The clock pulses supplied to the coincidence gate 11 will therefore sample positive and negative signal levels alternately and so provide a final output signal comprising a sequence of "pulses" alternately present and absent. Alternatively the signal may be considered as similar to that in the "black" condition but of half the pulse repetition frequency.

If a pulse present is represented by "1" and a "pulse" absent by "0" then a black area is encoded as 111111 . . . and a white area as 010101 . . . .

It will be appreciated that, although a signal code of 11111 . . . is characteristic of a black scan and 101010 . . . of a white scan, each digit may be representative of a black or white condition. Thus in the encoded signal 11110 . . . the "0" digit can definitely be said to represent a white portion (which may be of only one digit duration) no matter what digits follow it. Equally, in the encoded signal 0101011 . . . the final "1" can definitely be said to represent a black portion (which may be of only one digit duration) no matter what digits follow it.

To this extent therefore the code is a single digit code. It can therefore be considered that black is represented by the single digit "1" and white is alternately represented by the single digit "1" and by the single digit "0."

After transmission along the line from terminal 15 as a bipolar signal the signal is regenerated at the receiver and returned to its monopolar state. It is then supplied to a code input terminal 17 of a decoder shown in FIG. 2. A clock pulse signal, which is derived from the received signal, is supplied to a second terminal 18 of the decoder.

The decoder comprises a three-input gate 19, a negative output signal from which is obtained when all three input signals are negative. One input terminal of this gate is connected to the code input terminal 17 of the decoder by way of an amplifier 20, this input signal comprising negative-going pulses corresponding to the code input signal. A second input terminal of this gate 19 is connected to the code input terminal by way of an amplifier 21, a delay circuit 22 and a bistable circuit 23 (which is adjacent the code input terminal 17). The bistable circuit 23 has two trigger inputs each of which is effective to turn its respective stage "on" when supplied with a suitable polarity pulse. The code input terminal 17 is connected to one of these trigger-inputs. An output signal from the bistable 23 is obtained from the other stage, this output signal being supplied to the delay circuit 22 and amplifier 21 mentioned above. Each input code pulse is thus effective to switch the bistable circuit 23 to that state (if it did not previously exist) in which a negative signal is supplied to the gate 19 but delayed by a fraction of a clock pulse period by the delay circuit 22.

The third input to the gate 19 comprises amplified and differentiated clock pulses supplied from the clock pulse input terminal 18 by way of several amplifying stages 24, 25 and a differentiator 26. The signal as supplied to the gate is therefore a series of sharp, negative-going pulses.

This third input signal to the coincidence gate is also supplied to gate 27, the code input signal providing an inhibiting input signal so that only those differentiated clock pulses which do not coincide with the code pulses are passed by this gate 27. The inhibit gate output signal is supplied to amplifying stages 28 and then as negative-going trigger pulses to the trigger input of the output stage of the above bistable circuit 23. As these differentiated pulses correspond to the pulses absent from the code input signal, one or other stage of the bistable circuit 23 is triggered at every clock pulse.

A second bistable circuit 31 has two trigger inputs, each when supplied with a negative-going pulse switching or maintaining its respective stage "on." One of these trigger inputs is supplied with the amplified signal from the inhibit gate 27 and the other with an amplified signal from the gate 19, the pulses of both of which signals are negative-going as required. An output signal from this bistable circuit 31 is supplied to a delay stage 32 which provides a delay of half of a clock pulse period but only for signal transitions corresponding to a "white" to "black" transition. The signal supplied by this delay stage 32 is amplified and appears at output terminal 33 as a replica of the output signal from the scanner at the transmitter.

The operation of the decoder is as follows. During an uninterrupted pulse sequence of the code pulse input signal (i.e. a "black" period), the first bistable circuit 23 supplies a constant enabling signal to the gate 19. The direct (amplified) code input to this gate 19 enables it at each code pulse so that the third input signal, the differentiated clock pulses, are supplied to the second bistable circuit 31 to maintain it in its "black" state and give a constant level output signal accordingly.

During a sequence of alternate pulses present in the code pulse input signal (i.e. a "white" period), the absent pulses are supplied to the first bistable 23 by the inhibit gate 27 so switching it over, for alternate clock pulse periods, to its disabling state. Owing to the delay, however, the disabling periods of the bistable signal to the gate 19 overlap in time the following pulse of the code input signal and so prevent the gate passing the differentiated clock pulses which coincide with the alternate pulses present in the code input signal. A positive output signal is therefore provided by the gate 19 for the whole of the period in which alternate pulses only are present in the code input signal. The second bistable circuit 31 is consequently switched to its "white" state for this period.

It can be seen that the coder can only define a "black" to "white" transition to within one clock pulse period, that is, the transition may actually have occurred at any time within the pulse period preceding the first "0" or pulse absent. On average it will have occurred half way through that period so that the coded signal will have, on average, a delayed response to "black" to "white" transitions of half the clock pulse period.

On coding a "white" to "black" transition the actual transition may occur at any time within two clock pulse periods after a pulse absent, that is, it is not evident from the coded signal whether the first pulse of a complete sequence is the pulse of the 01 code group of a white condition, or the first 1 of a series of pulses of a black condition. There is therefore an uncertainty of two pulse periods in a white to black transition, and on average the actual transition will have occurred one pulse period before the indication in the decoded output signal.

In order therefore to maintain, on average, the correct duration of the white condition the output signal is delayed for the black to white transition by half of one pulse period, that is the difference between the average delays inherent in the system.

I claim:

1. A binary data transmission system for encoding and decoding binary data transmitted at a data bit-rate, said encoder comprising means responsive to two kinds of information to provide a two-level signal having one of two levels according to which of the two kinds of information is presented; means for generating a clock pulse signal at said data bit rate of the system; and means responsive to said two-level signal to transmit said clock pulse signal in response to one of said two levels and to inhibit alternate pulses of the clock pulse signal and thereby transmit only the remaining pulses of said clock pulse signal, in response to the other one of said two levels, the output of said means responsive to said two-level signal forming an encoded signal.

2. A system according to claim 1, wherein said means responsive to said two-level signal comprises: bistable circuit means having first and second inputs, said clock pulse signal being applied to said first input directly; inhibit gate means to which said clock pulse signal is applied and which is reseponsive to said two-level signal to inhibit said clock pulse signal in the presence of said other one of the two levels, the output of the inhibit gate means being applied to said second input of the bistable circuit means which is connected to change state at the occurrence of each clock pulse when applied to both of said first and second inputs and to remain in a first state when the clock pulse signal is inhibited by said inhibit gate means; and further gate means to which is applied said clock pulse signal and an output from said bistable circuit means, the output of said further gate means comprising an encoded clock pulse signal in which all pulses are present during said one level of said two level signal and in which alternate pulses are absent during said other level of said two level signal.

3. A system according to claim 2, wherein the output signal from said further gate means, which output signal comprises unipolar pulses, is applied to bipolarizer means effective to invert alternate pulses of the signal and produce a bipolar return-to-zero pulse signal.

4. Decoding apparatus for a system according to claim 1, and comprising: means to provide a clock pulse signal at said data bit rate of the system and synchronized to said clock pulse signal at said encoder; inhibit gate means to which said encoded signal and the clock pulse signal are applied, the output of said inhibit gate means being a pulse signal comprising a pulse for each pulse in the clock pulse signal for which there is no corresponding pulse in the encoded signal; second gate means; first bistable circuit means to which output pulses from the second gate means are applied to maintain one stable state thereof and to which output pulses from said inhibit gate means are applied to maintain the other stable state thereof, second bistable circuit means triggered to one stable state thereof at each pulse of said encoded signal and triggered to the other stable state thereof at each inhibited pulse of said second encoded signal, said bisable circuit means producing a signal corresponding to said encoded signal but of non-return-to-zero form; delay means delaying said non-return-to-zero signal by a fraction of a clock pulse period; differentiating means producing a differentiated clock pulse signal; said second gate means having first, second and third inputs to which are applied respectively the encoded signal, said non return-to-zero signal delayed by said fraction of a clock pulse period, and said differentiated clock pulse signal, said second gate means being enabled to maintain said one stable state of said first bistable circuit means by the coincidence of a differentiated clock pulse, a pulse of the encoded signal and the immediately previous occurrence of a pulse of the encoded signal; and an output terminal to which said first bistable circuit means applies a two-level signal, the two levels corresponding to the two states of said first bistable circuit means and constituting the binary information transmitted by the system.

References Cited

UNITED STATES PATENTS

| | | | |
|---|---|---|---|
| 3,102,238 | 8/1963 | Bosen | 325—30 |
| 3,142,723 | 7/1964 | Fleming | 325—30 |
| 3,165,583 | 1/1965 | Kretzmer et al. | 325—30 |
| 3,417,332 | 12/1968 | Webb | 325—163 |
| 3,432,613 | 3/1969 | Saeger et al. | 178—6 |

ROBERT L. GRIFFIN, Primary Examiner

J. A. BRODSKY, Assistant Examiner

U.S. Cl. X.R.

178—68; 325—143, 164